Jan. 26, 1943. J. KUGELMAN ET AL Re. 22,257

METHOD OF MAKING HOSIERY

Original Filed Jan. 2, 1937 2 Sheets-Sheet 1

Inventor
JACK KUGELMAN
JOSEPH EARNEST GARRETT
By Leon Edelson
Attorney.

Jan. 26, 1943. J. KUGELMAN ET AL Re. 22,257

METHOD OF MAKING HOSIERY

Original Filed Jan. 2, 1937 2 Sheets-Sheet 2

Inventor
JACK KUGELMAN
JOSEPH EARNEST GARRETT
By Leon Edelson
Attorney

Reissued Jan. 26, 1943

Re. 22,257

UNITED STATES PATENT OFFICE 22,257

METHOD OF MAKING HOSIERY

Jack Kugelman, Abington, and Joseph Earnest Garrett, Philadelphia, Pa.; said Garrett assignor to said Kugelman Original No. 2,180,593, dated November 21, 1939, Serial No. 118,870, January 2, 1937. Application for reissue November 19, 1940, Serial No. 366,317

1 Claim. (Cl. 66—82)

Figure 1:
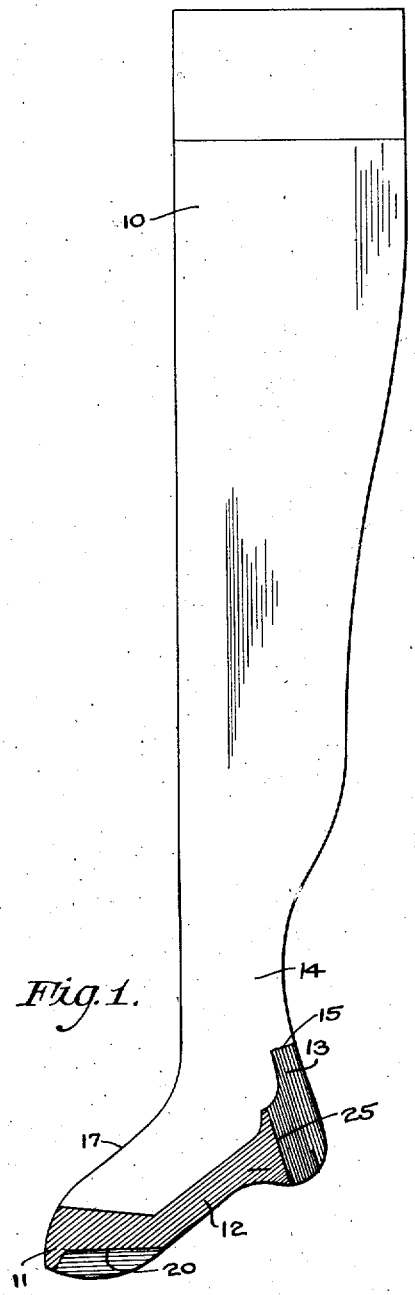

This invention relates to full-fashioned hosiery and more particularly to an improved method of manufacturing the same.

Heretofore and prior to this invention, full-fashioned hosiery has been manufactured in accordance with one or the other of two generally established methods. According to the first method, the leg of the stocking is knit in the form of a flat web upon a flat-bed full-fashioned knitting machine, known in the art as a "legger," the leg fabric so knit being then transferred to a second knitting machine, known as a "footer," on which the foot of the stocking is knitted to complete the full stocking blank. The flat fabric so produced is provided with selvaged edges which when joined together by a seaming operation result in the formation of a shaped or full-fashioned stocking. The leg fabric initially produced on the legger includes not only the leg proper but also the reduced ankle portion and heel tabs, while the foot portion which is knitted on the footer in continuation of the leg includes not only the sole and toe portions but also the instep part of the stocking. In accordance with established practice, the heel, toe and sole portions of the stocking blank are of reinforced construction.

According to the second method now in general use, the complete stocking blank including leg and foot portions is knitted upon a single knitting machine, known as a "single unit machine." This machine, embodying as it does mechanisms for effecting upon it the knitting of the leg and foot portions of a stocking in a single operation, is much more complicated in construction and, accordingly, more expensive than the more generally employed legger. Additionally, to replace existing leggers and footers with the more recently developed single unit machines, in the case of most hosiery manufacturers, would involve an economic loss which would be disproportionate to whatever benefits and advantages might be gained in fabricating hosiery on the single unit machines instead of on the leggers and footers now in general use.

Recognizing, however, the inherent advantages in fabricating a stocking in one operation, the present invention has as its object to provide a method whereby this may be substantially accomplished without necessitating any change-over from the standard leggers to the single-unit machines, it being contemplated by this new method to knit upon the standard legger machine and in a single operation a substantially complete stocking blank which includes the leg, instep, sole, toe and upper heel portions, leaving only to be separately knitted the lower heel tabs which originally had been formed as parts of the leg fabric produced on the legger in accordance with the old and long-established practice.

By means of this method, the standard leggers may be employed to produce what are in effect single unit stockings, there being no break or line of demarcation whatsoever between the non-reinforced or sheer leg and instep portions of the stocking blank.

Other objects and advantages of the invention will appear more fully hereinafter, it being understood that the invention consists substantially in the construction, location and relative arrangement of the stocking parts as well as in the method of producing the stockings, all as will be described in detail hereinafter, as shown in the accompanying drawings and as finally pointed out in the appended claim.

Figure 6:
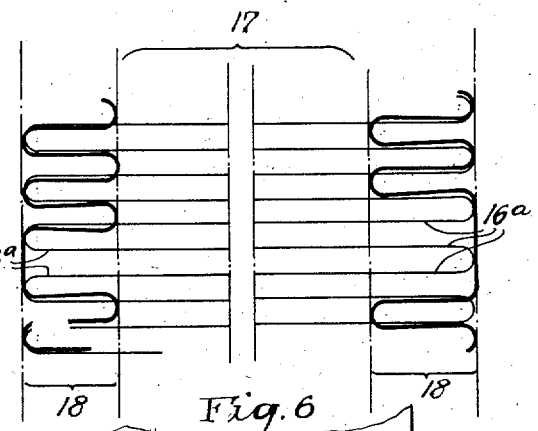

In the accompanying drawings:

Figure 1 is an elevational view of a stocking constructed in accordance with and embodying the principles of the present invention, Figures 2, 3, 4 and 5 show the lower portion of the stocking web as it appears during different stages in the manufacture of the stocking, and Figure 6 illustrates diagrammatically the stitches of the fabric in the immediate vicinity of the loose courses formed in opposite sides of the stocking blank.

Referring now to the drawings, it will be observed that the upper or leg portion 10 of the stocking fabric is knitted upon the standard flat-bed knitting machine (legger) in accordance with the established practice well known in the art, the fabric being knitted in the form of a flat web having selvaged edges and the web being fashioned by gradually decreasing the width of the fabric as the knitting progresses toward the lower extremity of the web. This fashioning or narrowing is effected by transferring predetermined numbers of end loops on each side of the stocking inwardly toward the center of the stocking web and at the same time reducing correspondingly the travel of the reciprocating yarn carriers which lay the yarn upon the sinkers and dividers and along the needles of the machine to form the successive courses of knitted loops.

The fabric which composes the leg portion 10 of the stocking is ordinarily knitted of a single yarn, usually silk, while other parts of the stocking such as the toe part 11, the sole part 12 and the heel part 13 (see Figure 1) are knitted of a heavier yarn or of a plurality of yarns to provide adequate reinforcement and strength in these latter parts. As the knitting progresses into the fashioned ankle portion 14 of the stocking fabric and approaches the upper limits of the high splice heel reinforcements 15—15, three carriers are thrown into operation, one of which lays the body silk along the entire bank of needles employed in the knitting operation while the remaining two operate successively to lay the reinforcing yarn along so much of the needles as are employed to knit the said high splice heel reinforcements.

Up to this point, the knitting of the stocking in accordance with the present method is the same as and follows the well-known established practice. In accordance with this latter practice, when the knitting reached the point where the high splice joined the heel pocket tabs at approximately the lines 16—16 of Figure 2, the further knitting of the central or non-reinforced part of the stocking web was interrupted, the knitting being continued from that point on to form only the opposed reinforced heel tabs, which latter projected below the horizontal line along which the stocking leg was subsequently transferred to the needles of the footing machine.

Figure 2:
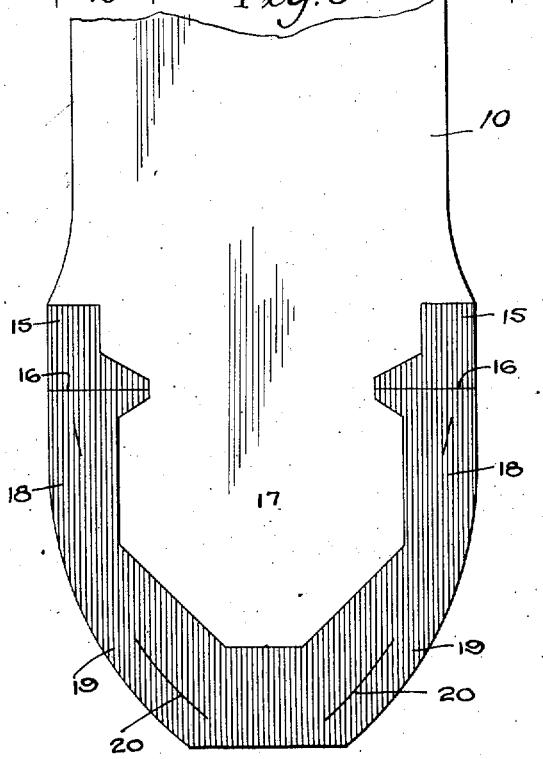

According to the present method, there is no interruption in the knitting of the sheer or non-reinforced part of the stocking, the leg portion 10 and the instep portion 17 being knit in a single, continuous operation so that there is no line of demarcation between these portions. Also, simultaneously as the instep portion 17 is being knitted, the reinforced sole portions 18—18 are knitted as well as the reinforced toe portions 19—19. It will be understood, of course, that in knitting the flat web fabric shown in Figure 2, the operation is much the same as in knitting the leg of a stocking, the reinforced parts being formed by extra carriers which lay the reinforcing yarn along the needles in the manner well understood in the art. As the knitting progresses, well into the sole part of the stocking foot, the narrowing mechanisms of the machine are operated to further shape the stocking blank, fashioning sutures 20—20 being located in the reinforced toe parts of the stocking blank as shown in Figure 2. By the proper adjustment of the stops for the several carriers, the shape of the reinforced areas of the blank may be varied as desired, that shown in Figure 2 being representative of a typical stocking blank constructed in accordance with the present invention. It will be understood, of course, that the knitting of the blank proceeds in the usual manner with the successive courses interlooped, each course extending transversely of the web from selvage edge to selvage edge thereof. During the operation of knitting the flat web shown in Figure 2, provision is made for the necessary subsequent joinder thereto of the lower heel tabs (see elements 21—21 of Figures 3, 4 and 5) and for this purpose loose courses 16a—16a (see Figure 6) are interposed in the opposed reinforced parts of the web, these loose courses being coincident with the lines 16—16 (see Figure 2). These loose courses are relatively few in number, say 2 or 3 courses, and in addition are knit of the basic silk or yarn of the stocking, that is, without reinforcement, the reinforcement yarn carriers being thrown out of operation during the knitting of these loose courses.

With the web knit as hereinbefore described and as shown in Figure 2, it is transferred by means of a transfer bar to a second flat-bed knitting machine, known as a heeling machine, on which the above-mentioned heel tabs 21—21 are knitted as extensions of the originally fabricated web. These heel tabs 21—21 spring from the loose courses 16a—16a and extend for whatever length or number of interlooped courses is predetermined to be proper. Actually, the tabs are of a length (the dimension being measured wale-wise) not less than the transverse width of its associated loose course or courses 16a.

Figure 3:
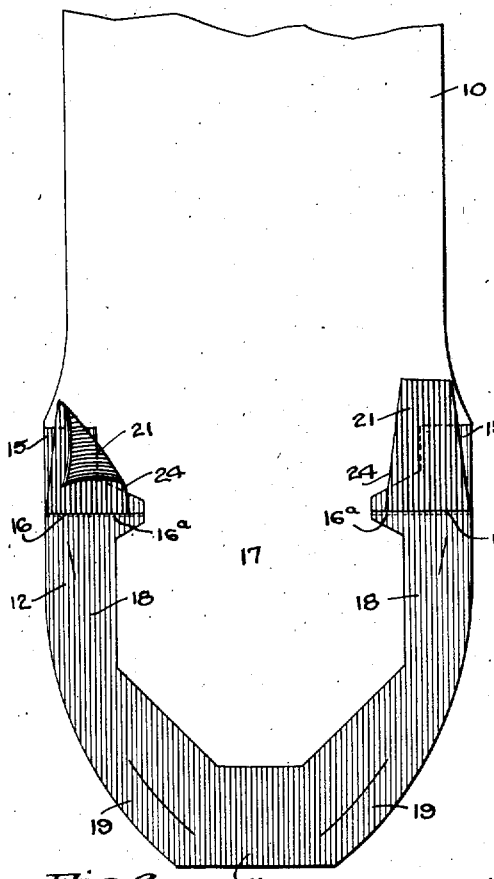
Figure 4:
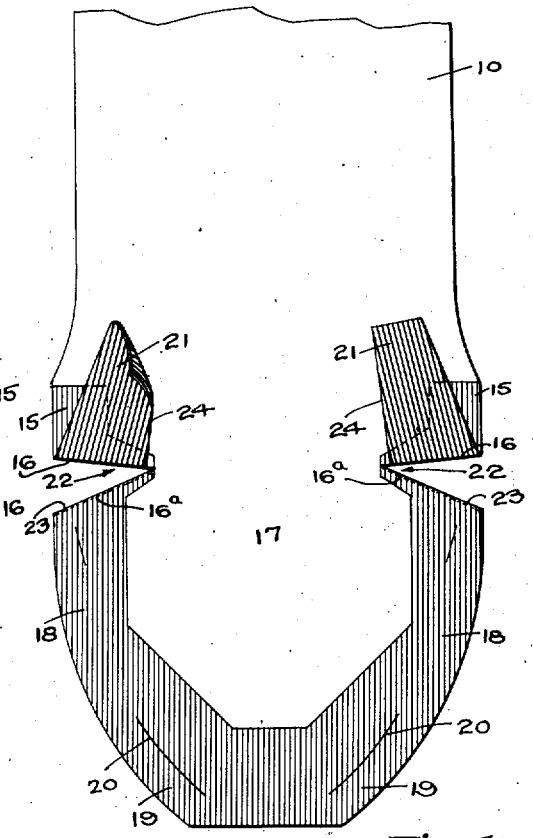

When the heel tabs 21—21 have been knit as integral extensions to the main stocking web, the resultant structure is as shown in Figure 3 and following the removal of this structure from the heeling machine (in which both of the heel tabs are simultaneously knit), the stocking blank is transferred to a circular looping machine upon the needles of which are transferred the loose knit, non-reinforced loops of the courses 16a—16a of the fabric shown in Figure 3. The loose courses 16a—16a, so transferred to the looping machine needles are preferably those immediately adjacent the close-knit reinforced courses of the sole portions 18—18 and when such transfer has been effected the sole portions 18—18 are severed at opposite sides thereof immediately in advance of each of the said loose courses 16a—16a, as indicated at 22—22 in Figure 4. With the web severed at the opposite sides thereof, as at 22—22, a resultant structure is obtained in which the heel tabs 21—21 may each be extended as prolongations of the heel parts 15—15, at the same time that there is provided the freely disposed edges 23—23 which are, of course, not selvaged.

Figure 5:
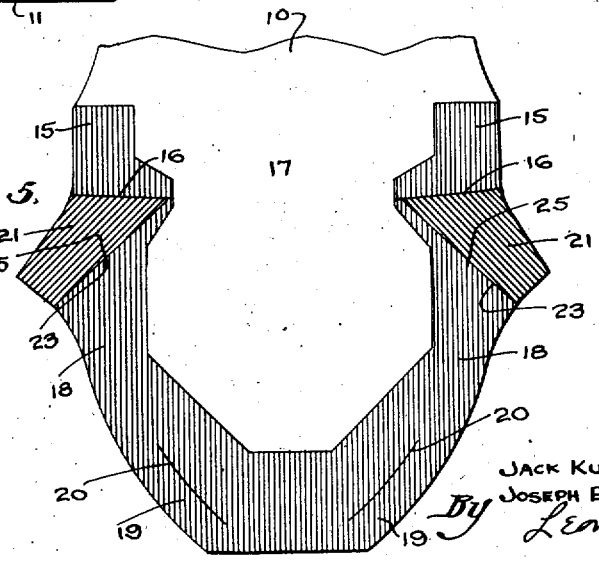

Thereafter, and while the said edges 23—23 are still engaged by the needles of the looping machine, the inner edges 24—24 of the heel tabs are also transferred or topped onto the looper needles so that the edges 23—23 and the edges 24—24 are intimately and coincidentally related, whereupon they may be looped together upon operation of the looping machine to form the blank of Figure 5.

By properly relating the heel tabs 21—21 to the cut edges 23—23 of the stocking blank so that said latter edges are respectively coincided or brought into alinement with the inner edges 24—24 of the heel tabs, they may be looped or otherwise joined together along the lines 25—25 to render the blank complete and ready to be seamed along the selvage edges thereof to form the stocking of Figure 1. It will be apparent that the severed edge 23 of the fabric, extending as it does course-wise of the fabric, gives or stretches sufficiently to match the linear dimension of the inner edge 24 of the heel tab and it is further to be noted that when the edges 23 and 24 have been properly looped together, as at 25, the line of juncture appears no more noticeable than the ordinary suture line present in stockings of conventional construction.

It will be observed from the foregoing that with the exception of the heel pocket tabs 21—21 the entire stocking fabric is knitted in the form of a flat fashioned web upon the conventional full-fashioned flat-bed knitting machine of the legger type, the knitting of the fabric being effected in a continuous operation without necessitating removal of the fabric from the machine until after it has been completely fabricated. To produce the blank of Figure 2, no structural changes are required in the knitting machine, it being only necessary to make those ordinary adjustments of the carrier stops, the narrowing and other associated mechanisms to provide the necessary shape to and reinforcements in the stocking web. These adjustments are such as are within the capacity of any skilled operator to make.

It will be understood, of course, that the invention is susceptible of various changes from time to time without departing from the real spirit or general principles thereof and it is accordingly intended to claim the same broadly, as well as specifically, as indicated by the appended claim.

What is claimed as new and useful is:

A method of manufacturing full-fashioned hosiery which consists in knitting on a conventional full-fashioned flat bed legger machine a stocking blank in the form of a flat web and having opposed selvedged edges and including reinforced toe, sole and high splice heel parts, the latter being knitted substantially in the form of a U, the knitted area within the U-shaped reinforced area constituting the instep of the stocking and being plain knitted in continuation of the plain knitted leg portion of the stocking, the body yarn of which said leg and instep portions are plain knitted being extended into and through the reinforced areas disposed upon opposite sides of the instep portion; in knitting exclusively of said body yarn loose courses in said last-mentioned reinforced areas along lines defining the lower edges of said high splice heel parts; in knitting heel tab extensions upon the opposite side parts of said reinforced U, said extensions being joined to the blank along said line defining the lower edges of said high splice heel parts and immediately above said non-reinforced loose courses; in so severing the blank in said last-mentioned reinforced areas along courses downwardly removed from said line of juncture of said heel tabs to said blank as to leave intact one or more of said loosely knit courses; in angularly relating said heel tabs to the free severed edges of the blank so as to render the inner selvedge edges of the heel tabs coincident with the said loose courses along the severed edges of the blank; and in looping said coincident edges together to provide a blank ready to be longitudinally seamed to form a completed stocking.

JACK KUGELMAN.
JOSEPH EARNEST GARRETT.